July 25, 1961  C. R. SUSKA  2,993,514

TEMPERATURE STABILIZED PRESSURE RESPONSIVE SYSTEM

Filed Aug. 4, 1958

INVENTOR.
Charles R. Suska
BY
Mead, Browne, Schuyler and Beveridge
ATTORNEYS

United States Patent Office

2,993,514
Patented July 25, 1961

2,993,514
TEMPERATURE STABILIZED PRESSURE RESPONSIVE SYSTEM
Charles R. Suska, Roxbury, Conn.
Filed Aug. 4, 1958, Ser. No. 752,692
5 Claims. (Cl. 137—779)

This invention relates to pressure responsive systems and more particularly to pressure responsive systems which are stabilized against effects of temperature thereby adapting them for use in connection with precision instruments and accurate control devices.

Pressure responsive members, or transducers employed in such systems are commonly made up of multiple, corrugated-surface diaphragms or corrugated wall bellows elements in which the linear expansion of the pressure sensitive element is primarily a function of the difference between an internal, confined pressure and an external pressure which may or may not be confined. Any practical transducer system includes also rigid structural members such as interconnecting coupling members, end fittings and supporting members in various combinations, as well as connecting members to couple the pressure responsive or measuring member to dependent registering or controlling mechanisms. All of these members, including the pressure sensitive member itself, are subject to temperature effects and all may make a contribution to the net mechanical displacement of the system which is utilized for measurement or other purposes. It is therefore necessary to distinguish between the desired pressure effects and the spurious temperature effects as they affect the total system and, insofar as is possible, to eliminate the latter effects from the useful outputs.

Temperature effects on a pressure responsive system may be distinguished as producing two possible classes of error. The first class of error involves only the pressure responsive, or sensitive, member itself and depends upon the temperature coefficient of the modulus of elasticity of the material from which any resilient members are made. This results in variations with temperature of the "rate" or "sensitivity" of the sensitive element, that is, the amount of deflection per unit change in pressure, or, alternatively, the slope of the characteristic curve of pressure versus deflection.

The second class of error involves all components of the system and depends upon the temperature coefficient of expansion of each of the materials used to make up the complete system. The net contribution of the temperature expansion of all components results in "zero-shift" which is an error linearly proportional, to a first degree of approximation, to the ambient temperature.

With respect to the first class of error described above, materials having a modulus of elasticity which is substantially constant despite thermal changes are commercially available and by forming the pressure responsive diaphragm or bellows members from such materials it is well known that the change of rate may be held within acceptable limits. One such constant modulus material is the well known alloy sold under the trademark Ni-Span-C.

With respect to the second class of error, namely, thermal expansion effects, materials having a substantially zero coefficient of expansion are also commercially available. An example of such a material is the well known alloy sold under the trademark Invar. It is not to be assumed, however, that zero-shift can be eliminated by forming all parts of the system from such a material. In the first place, if a constant modulus material is used for the pressure responsive member of the system, its thermal expansion may be significant. Also, the very low coefficient of expansion materials have a coefficient of expansion which is only zero to a first degree of approximation and in any practical design, the residual expansion may still be in excess of desired limits. Furthermore, as a practical matter, such alloys are expensive and are usually not readily amenable to ordinary manufacturing operations. Therefore, other solutions for zero-shift effects are generally considered preferable.

Methods of dealing with the above described zero-shift effects are known in the art. One approach has been based on the use of combinations of constant modulus of elasticity and very low coefficient of thermal expansion materials, as described above, and the shortcomings of this approach have been indicated. Other prior art methods have been based on the use of bimetallic materials, the deflections of which under the influence of ambient temperatures are adapted to oppose the movements of a pressure responsive system, operating thereby to cancel temperature effects on the pressure system. These latter methods, in particular, involve complication of mechanical structure and sacrifice sensitivity in the response of the measuring system to pressure changes.

In contra-distinction to prior art approaches to the problem of zero-shift effects, a pressure responsive system according to the present invention greatly simplifies mechanical design problems by permitting a wide selection of fabricating materials and, in providing for both negative and positive thermal expansion effects, permits control of net expansion of the total system so that the net value may be zero or a positive or negative value if it is desired to compensate for similar errors in a dependent system.

Furthermore, it is a fundamental defect of many of the prior art systems that they assume that the rate of thermal effect is the same for all parts of the system. This is not the case in general, especially in systems where separate compensation means are provided, and this becomes of special significance in many aircraft instrumentation applications in which extreme and rapid temperature fluctuations are encountered. In this respect, a system according to the teaching of the present invention is further distinguished from prior art systems by providing compensations which utilize inherent qualities of the structure of the pressure responsive system itself, thereby minimizing any variations in rate of thermal response throughout the system.

It is therefore an object of the present invention to provide a new and improved pressure responsive system which is responsive substantially solely to pressure changes and is substantially unaffected by ambient temperature changes.

It is another object of the present invention to provide such a pressure responsive system which includes adjustable means adaptable to stabilize temperature effects, under influence of ambient conditions, of all elements of the system.

It is a further object of the present invention to provide such a pressure responsive system in which the output deflection with respect to pressure alternatively can be made exactly stabilized for ambient temperature variations, or under- or over-stabilized to adapt the system to other dependent systems to which it may be coupled.

It is still another object of the present invention to provide such a pressure responsive system in which expensive alloys of special properties may be used without making the system unduly expensive.

It is a still further object of the present invention to provide such a pressure responsive system which is particularly adapted to miniaturization.

Other objects and advantages of the present invention will become more apparent from the following detailed description, taken in conjunction with the attached drawings, in which.

Figure 1:
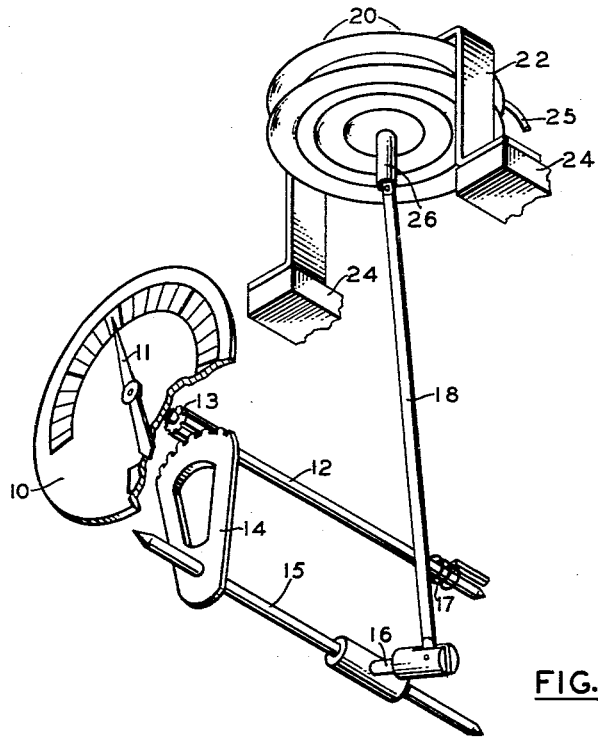
FIG. 1 is a view showing assembled components, including a pressure indicator, of a temperature stabilized pressure responsive system according to one embodiment of the present invention.

Referring to the drawing, FIG. 1 shows a typical structure adaptable to uses in measurement of pressure especially in such applications as in aircraft where minimum size and weight are required and yet maximum accuracy is also required despite wide and rapid changes in ambient conditions. The assembly of FIG. 1 includes a scale 10 having suitable indicia thereon which is traversed by a pointer 11, the latter being carried by a shaft 12. A pinion 13 is mounted on shaft 12, adjacent scale 10, and is driven by a sector gear 14 which is mounted on a shaft 15. The latter shaft is turned in response to movement of a lever arm 16 which, in turn, is moved in response to longitudinal movement of an elongated link member 18. Lengthwise movement of link member 18 is thus converted into rotary movement of shaft 15 which, by virtue of the engagement between sector gear 14 and pinion 13, causes rotary movement of shaft 12 and pointed 11. A spiral spring member 17, or the like, is suitably mounted on shaft 12 to impart a torque to the shaft which is transmitted throughout the system, this torque being sufficient only to take up backlash in the system.

The pressure responsive member of the system is indicated generally by the reference numeral 20 and, in the particular embodiment shown in the drawing, takes the form of a bellows assembly which comprises two identical series connected corrugated diaphragm capsules 23. Pressure responsive member 20 is attached to a U-shaped mounting bracket member 22, as shown in the drawing, and the ends of the legs of the bracket are connected, by suitable means not shown, to a fixed support means such as spaced apart pillars 24. The positioning of pressure responsive member 20 with respect to mounting bracket 22 is preferably as is shown in the drawing wherein the pressure responsive member is located between the bracket legs and is adapted to expand and contract along an axis A—A which is located substantially midway between the bracket legs and is substantially perpendicular to the cross wall member 22A which connects the legs of the U-shaped bracket member 22.

Pressure responsive member 20 is provided with end fittings 26 and 27. Elongated link member 18 is connected to end fitting 26 at the location indicated by reference numeral 26A and, insofar as mounting bracket 22 is concerned, end fitting 26 is the take-off end of pressure responsive member 20. End fitting 27 is attached to wall member 22A of bracket member 22, the connection being indicated by reference numeral 27A and being such that the pressure responsive member 20 is adequately supported for movement of take-off end 26 along axis A—A. End fitting 27 includes a fluid passage giving access to the interior of pressure responsive member 20 from tube or the like 25 which leads from a suitable source of external pressure, not shown. The two identical capsular elements 23 of pressure responsive or bellows member 20 are series connected by a spacer member 28 which is provided with an axially extending passage as shown in FIG. 2 to provide fluid passage between the capsules.

The capsular elements 23 are of conventional corrugated diaphragm construction but are made of a thin, resilient material of constant modulus of elasticity such as the alloy sold under the trademark Ni-Span C. It is apparent that the form of pressure responsive member could be that of the conventional corrugated wall bellows, also made of the alloy sold under the trademark Ni-Span C, without departing from the teaching of my invention. The fittings, such as end fittings 26 and 27, are made of materials selected for commercial availability and thermal expansion, such as brass. The materials and dimensions of the end fittings, spacers, and mounting means are chosen in accordance with the following principles.

In response to pressure applied to pressure responsive member 20, the end fitting 26 is moved in linear translatory motion along the axis A—A. As mentioned above, with resilient members made of a material of constant modulus of elasticity, preferably the alloy sold under the trademark Ni-Span C, there is developed a constant relation between increments of this linear motion and corresponding increments of pressure change over a wide range of temperature. However, the complete pressure responsive system supported on the fixed support members (such as members 24 shown in FIG. 1) is subject to further linear movement along axis A—A independent of any pressure but dependent on ambient temperature.

Figures 2, 3, 4:
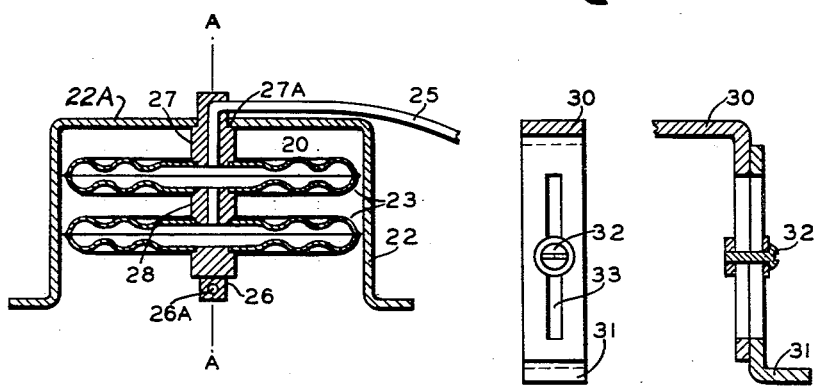
FIG. 2 is a cross sectional view of the pressure responsive member and support therefor shown in FIG. 1.
FIG. 3 is an enlarged partial sectional view of a portion of an alternative adjustable pressure responsive member support structure.
FIG. 4 is an end view of the structure shown in FIG. 3.

This factor is taken into account according to the teaching of the present invention by providing that, for any given pressure value, temperature changes due, for example, to ambient air conditions, will cause expansion of bellows supporting bracket 22 in a direction parallel to the axis A—A which, as shown in FIGS. 1 and 2, is expansion upwardly with respect to the fixed support members or pillars 24. Meanwhile, for the same temperature conditions, the expansion of the pressure responsive capsular members 23, and their accessory parts, will cause motion of end fitting 26 downwardly along axis A—A from fixed connection 27A.

Although by this arrangement these oppositely directed motions tend to be mutually compensatory, with randomly selected materials and dimensions, the net motion at the take-off point 26A may still be significantly other than zero for a constant pressure but varying temperature condition. Furthermore, considering a complete system such as that illustrated in FIG. 1 it will be seen that an additional temperature effect may be introduced by the elongated link 18, and possibly by other members of the dependent registering part of the system, occurring also as motion along axis A—A and presumably being directed downwardly from take-off point 26A. By providing, therefore, for algebraic addition of these thermal effects, I can select available materials of positive (or negative) coefficients of linear expansion and so proportion the dimensions of parts that the net overall motion under the influence of temperature is substantially zero.

It will be observed that in the particular embodiment of my invention shown in FIG. 1, the requirement for net overall motion of zero along axis A—A would imply that take-off point 26A be moved upwardly by the expansion of components such as U-shaped mounting bracket 22. In other words, ignoring for the moment the downward movement of take-off point 26A resulting from pressure applied to bellows member 20, the bellows member and consequently take-off point 26A is moved bodily upwardly in response to upward movement of connection 27A resulting from expansion of mounting bracket 22. Such requirement for upward movement of take-off point 26A in response to thermal expansion of bracket 22 is significant because pressure responsive members such as that shown in FIG. 2 are commonly considered as components available for a variety of equipment applications, as in registering instruments or control apparatus, and, as such, must be adaptable to a variety of dependent system components of which those shown in FIG. 1 may be considered as a simple example. The teaching of my invention therefore provides for incorporation of a pressure responsive member and support therefor into a complete system if all conditions are known or, if they are not known in advance, it provides for adjustability to adapt to a wide range of conditions of use.

An example of means for adjustably matching the temperature effects of the pressure responsive member 20 to its supporting bracket or the like is shown in FIGS. 3 and 4. As shown in these figures, the symmetrical arms of the U-shaped bracket member 22 (FIGS. 1 and 2) are each divided into two parts or leg portions, one being an inner part designated by the reference numeral 30 and the other being an outer part designated by the reference numeral 31. These parts, or leg portions, are dimensioned as shown in FIGS. 3 and 4 so as to be slidable with respect to each other, preferably in directions parallel to axis A—A. Each part includes an elongated slot 33, the slots being positioned opposite each other so as to receive a clamping screw 32 or the like whereby the parts 30 and 31 may be adjustably clamped in position with respect to each other if desired. Preferably, leg parts 30 and 31 are made of materials of considerably different coefficients of expansion so that their effective total expansion will depend on the point at which the parts are clamped together. For example, one part may be made of the alloy sold under the trademark Invar and the other part may be made of brass. The point at which the parts are clamped together is readily adjustable to meet requirements by sliding the clamping screw 32 along the juxtaposed slots 33 and then, of course, tightening the clamping screw at the desired point.

From the foregoing description, it is seen that the present invention provides a temperature stabilized pressure responsive system particularly adapted for use in connection with precision instruments and accurate control devices. The constant modulus of elasticity pressure responsive member, either of the capsular or corrugated bellows type, is supported with respect to a fixed support or base by means such as a U-shaped, or cup-shaped, mounting bracket whereby the pressure responsive member may be moved bodily along a predetermined axis in response to expansion or contraction of the mounting bracket caused by temperature changes. The mounting bracket or cup may be made in one or two parts, the latter being utilized if adjustability is desired as explained above. By combining a pressure responsive member of known pressure responsive characteristics with a mounting bracket of known temperature responsive characteristics, in accordance with the teaching of my invention, the entire system can be assembled so that the net overall motion of the power take-off point of the system, under the influence of temperature, is substantially zero. This provides for extreme flexibility of design, being readily adapted to miniaturization, and makes economical use of expensive alloys of special properties.

While I have described and illustrated embodiments of my invention, I wish it to be understood that I do not intend to be restricted solely thereto but that I do intend to cover all modifications thereof which would be apparent to one skilled in the art and which come within the spirit and scope of my invention.

I claim:

1. A temperature stabilized pressure responsive system comprising a pressure responsive member having a substantially constant modulus of elasticity and also having a take-off end movable along a predetermined axis of movement in response to changes in pressure exerted on said member, a fixed support member, and a mounting bracket having a first wall member connected to said fixed support member and a second wall member connected to said pressure responsive member, said bracket supporting said pressure responsive member with respect to said fixed support member to move said take off end of said pressure responsive member along said axis of movement relative to said fixed support upon thermal expansion or contraction of said bracket in response to changes in ambient temperature, and means on said first wall member for adjustably regulating the amount of movement imparted to said take off end of said pressure responsive member by a given change in ambient temperature.

2. A temperature stabilized pressure responsive system comprising a fixed support member, a substantially U-shaped bracket having the ends of the legs of the bracket mounted on said fixed support member, each leg of said bracket having a first section and a second section of different coefficients of thermal expansion, means for connecting said first and said second sections to each other, and means for varying the point of connection between said sections to thereby vary the effective longitudinal expansion and contraction of said legs relative to said fixed support member upon variations in ambient temperature, and a pressure responsive member having one end connected to the cross wall of said U-shaped bracket and having an opposite take-off end movable along a predetermined axis of movement in response to changes in pressure exerted upon said pressure responsive member and also in response to expansion or contraction of said pressure responsive member caused by changes in temperature, said pressure responsive member having a substantially constant modulus of elasticity, and the take-off end of said pressure responsive member also being moved along said predetermined axis of movement in response to expansion or contraction of the legs of said U-shaped bracket caused by changes in temperature whereby movement of the take-off end of said pressure responsive member caused by changes in pressure exerted on said pressure responsive member and movement of said take-off end caused by expansion or contraction of said pressure responsive member and of the legs of said U-shaped bracket are added algebraically along said predetermined axis of movement.

3. A temperature stabilized pressure responsive system comprising a pair of spaced apart fixed support members, a pair of leg members, there being a leg member mounted on and extending from each of said fixed support members, a substantially U-shaped bracket having the legs of said bracket in contact with said first mentioned leg members, one of the bracket legs being in side by side contact with one of said first mentioned leg members and the other bracket leg being in side by side contact with the other of said first mentioned leg members, each of the contacting bracket legs and leg members being slotted and the slots being aligned, connecting means passing through the aligned slots in the contacting bracket legs and leg members to adjustably connect the bracket legs and leg members, a pressure responsive member having one end connected to the cross wall of said U-shaped bracket and having an opposite take-off end movable along a predetermined axis of movement in response to changes in pressure exerted on said pressure responsive member said pressure responsive member having a substantially constant modulus of elasticity and the legs of said U-shaped bracket having a coefficient of thermal expansion which is different from the coefficient of thermal expansion of said first mentioned leg members, and the take-off end of said pressure responsive member being movable along said predetermined axis of movement in response to expansion or contraction of said bracket leg members and said first mentioned leg members caused by changes in ambient temperature whereby movement of the take-off end of said pressure responsive member caused by changes in pressure exerted on said pressure responsive member and movement of said take-off end caused by changes in ambient temperature are added algebraically along said predetermined axis of movement.

4. A temperature stabilized pressure responsive system comprising a pressure responsive element adapted to be resiliently expanded or contracted along an axis of movement extending between opposed ends of said element, said element having a modulus of elasticity substantially constant over a normal range of ambient operating temperatures, a fixed support, a mounting assembly having a first portion fixedly secured to said support and a second portion movable relative to said fixed support along a stationary axis in response to thermal expansion or contraction of said mounting assembly, means fixedly securing one end of said pressure responsive member to said second portion of said mounting assembly to constitute the sole support of said pressure responsive member upon said mounting assembly with said axis of movement of said pressure responsive member in coincidence with said stationary axis, and means on said mounting assembly for adjusting the thermal expansion and contraction characteristics of said mounting assembly.

5. A pressure responsive system as defined in claim 4 wherein said means on said mounting assembly for adjusting thermal expansion and contraction characteristics comprises a pair of overlapped leg sections on said mounting assembly extending from said fixed support in generally parallel relationship to said stationary axis, each of said leg sections having a different coefficient of thermal expansion, and means for coupling said leg sections to each other at selected locations along the overlapped portions of said sections to thereby adjustably regulate the net thermal expansion of the coupled leg sections along said stationary axis.

References Cited in the file of this patent

UNITED STATES PATENTS

| | | |
|---|---|---|
| 1,178,466 | Bristol et al. | Apr. 4, 1916 |
| 1,238,776 | Jackson | Sept. 4, 1917 |
| 2,165,744 | Boettinger | July 11, 1939 |
| 2,166,603 | Menzer | July 18, 1939 |
| 2,301,879 | Jenny | Nov. 10, 1942 |
| 2,376,892 | Avigdor | May 29, 1945 |
| 2,487,213 | Bender | Nov. 8, 1949 |
| 2,628,501 | Knapp | Feb. 17, 1953 |
| 2,719,198 | Cunningham | Sept. 27, 1955 |